(12) United States Patent
Xiao

(10) Patent No.: US 10,920,792 B2
(45) Date of Patent: Feb. 16, 2021

(54) AIR CIRCULATOR

(71) Applicant: Comefresh Electronic Industry Co., Ltd., Fujian (CN)

(72) Inventor: Yongrui Xiao, Xiamen (CN)

(73) Assignee: Comefresh Electronic Industry Co., Ltd., Fujian (CN)

(*) Notice: Subject to any disclaimer, the term of this patent is extended or adjusted under 35 U.S.C. 154(b) by 227 days.

(21) Appl. No.: 16/041,825

(22) Filed: Jul. 22, 2018

(65) Prior Publication Data

US 2019/0331137 A1    Oct. 31, 2019

(30) Foreign Application Priority Data

Apr. 25, 2018  (CN) .................. 2018 2 0602976X U
Apr. 25, 2018  (CN) .................. 2018 2 06026954 U

(51) Int. Cl.
| | |
|---|---|
| *B01D 46/00* | (2006.01) |
| *F04D 29/70* | (2006.01) |
| *F04D 29/32* | (2006.01) |
| *F04D 29/22* | (2006.01) |
| *F04D 29/44* | (2006.01) |
| *B01D 46/24* | (2006.01) |

(52) U.S. Cl.
CPC ....... *F04D 29/703* (2013.01); *B01D 46/0005* (2013.01); *B01D 46/0045* (2013.01); *B01D 46/0047* (2013.01); *B01D 46/24* (2013.01); *F04D 29/2238* (2013.01); *F04D 29/325* (2013.01); *F04D 29/444* (2013.01)

(58) Field of Classification Search
CPC .. F04D 29/703; F04D 29/2238; F04D 29/325; F04D 29/444; B01D 46/0005; B01D 46/0045; B01D 46/0047; B01D 46/24
See application file for complete search history.

(56) References Cited

U.S. PATENT DOCUMENTS

| | | | | |
|---|---|---|---|---|
| 4,377,399 A | * | 3/1983 | Bryson ................... | A61L 9/122 239/57 |
| 4,627,862 A | * | 12/1986 | Frei ..................... | B01D 46/0036 55/467 |
| 5,435,817 A | * | 7/1995 | Davis ................. | B01D 46/0095 55/337 |
| 5,753,000 A | * | 5/1998 | Chiu ..................... | B01D 46/24 55/357 |

(Continued)

*Primary Examiner* — Aaron R Eastman
*Assistant Examiner* — Theodore C Ribadeneyra
(74) *Attorney, Agent, or Firm* — Raymond Y. Chan; David and Raymond Patent Firm

(57) ABSTRACT

An air circulator includes an airflow guiding housing and a power assembly. The power assembly is disposed in said airflow guiding housing which sequentially has a purifying chamber and a guiding chamber from bottom to top. The power assembly is operated to drive air to flow into the purifying chamber through an air inlet formed on a bottom peripheral side of the airflow guiding housing radially and deliver along an airflow channel inside the airflow guiding housing. The airflow channel further has an airflow turning portion in the purifying chamber to drive the air in the purifying chamber to turn from a radial direction to and an upward direction to flow into the guiding chamber and discharge out through an air outlet formed on top of the airflow guiding channel upwardly, outwardly and helically.

14 Claims, 9 Drawing Sheets

(56) References Cited

U.S. PATENT DOCUMENTS

| | | | |
|---|---|---|---|
| 6,280,493 B1* | 8/2001 | Eubank | B01D 45/14 55/398 |
| 9,821,259 B2* | 11/2017 | Bae | B01D 46/0008 |
| 9,943,794 B2* | 4/2018 | Jung | B01D 46/0047 |
| 9,950,289 B2* | 4/2018 | Jung | B01D 46/0005 |
| D844,767 S * | 4/2019 | Chen | D23/364 |
| 10,323,855 B2* | 6/2019 | Jung | F24F 11/89 |
| 10,406,470 B2* | 9/2019 | Bae | B01D 46/0019 |
| 10,436,469 B2* | 10/2019 | Mun | B01D 46/2403 |
| 10,518,205 B2* | 12/2019 | Mun | B01D 46/0008 |
| 2006/0201119 A1* | 9/2006 | Song | B01D 46/0024 55/471 |
| 2006/0277875 A1* | 12/2006 | Schuld | B01D 46/24 55/484 |
| 2008/0166232 A1* | 7/2008 | Pearce | F04D 29/703 415/220 |
| 2010/0092277 A1* | 4/2010 | Brazell | F04D 29/703 415/121.2 |
| 2010/0225012 A1* | 9/2010 | Fitton | F24F 6/14 261/116 |
| 2011/0236228 A1* | 9/2011 | Fitton | F04D 29/626 417/234 |
| 2011/0236229 A1* | 9/2011 | Fitton | F04D 29/703 417/234 |
| 2014/0020561 A1* | 1/2014 | Aery | B01D 46/2411 96/224 |
| 2014/0216259 A1* | 8/2014 | Iwaki | F24F 3/166 96/19 |
| 2016/0032942 A1* | 2/2016 | Jung | F04D 19/002 415/148 |
| 2016/0108929 A1* | 4/2016 | Su | F04D 29/703 415/177 |
| 2016/0238039 A1* | 8/2016 | Stewart | F04D 29/403 |
| 2016/0305454 A1* | 10/2016 | Gao | F24F 1/56 |
| 2017/0246576 A1* | 8/2017 | Jung | F24F 1/0071 |
| 2017/0246579 A1* | 8/2017 | Mun | B01D 46/24 |
| 2017/0248153 A1* | 8/2017 | Park | B01D 46/0008 |
| 2017/0363111 A1* | 12/2017 | Hur | B01D 50/002 |

* cited by examiner

AIR CIRCULATOR

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to electrical appliance, and more particular to an air circulation and guiding device for promoting and facilitating air flow within a predetermined airspace.

Description of Related Arts

Interior space is a relatively closed space that the air within the interior space may not have the same flowing and smooth feeling as the outdoor air circulation. With the further understanding of air pollution and the need of respiratory health, great attention is paid to the indoor air circulation system. Many buildings are now equipped with central ventilation systems and many family houses are provided with air purifiers or circulation fans.

However, conventional air circulation devices have some disadvantages. For example, conventional central ventilation system is difficult to build into an existing building because substantial modification is required to structure of the building and the cost thereof is relatively high. In addition, most of the old buildings are not suitable for remodeling. For another example, the conventional air purifier or circulation fan is in a larger overall size, especially the conventional air purifier with high purification efficiency, which not only has high complexity in purifying mechanism, but also increases the maintenance cost of the multi-layer filter.

The most important consideration for indoor air circulation is to increase the air flowing capability and the indoor air quality will be much improved if specific filtration or purification is equipped. However, many conventional air circulation devices are designed to merely provide one of the two functions, either filtration or circulation. An air circulation fan and an air purifier are independently made to work together. Furthermore, in order to enhance the purification efficiency of the conventional air purifier, one of the improvement methods is to enhance and complicate the filtration process, but it directly reduces the air mobility. Conventional air purifier has a linear filtration path with one way direction to filtrate the air flowing therethrough, wherein although the linear flowing path increases the purification efficiency via the complicated filtration procedures, the filtration range and area is limited that only a specific and limited range of air is filtered repeatedly. In other words, it fails to increase the air mobility while the cost of the equipment is increased. When the filtering range of indoor space is limited by the air circulation, it is meaningless to the decontaminate work of a room while it merely filter a limited region in that room.

Another disadvantage is that the conventional air circulation device is generally designed with high power in order to achieve circulation coverage in a large area region. If the indoor space is relatively large, the mobility in the entire space is difficult to be covered with a single air filter device, and it is also harder to filter the entire space merely relying on a single air filter device. Accordingly, a plurality of devices is required for air circulation and air filtration or a large space is preferred to be divided into various air circulation and/or air filtration regions. The conventional air circulation device looks pretty bulky and is a source of noise and vibration at home. Also, due to the larger space to be occupied by the convention air circulation device, it is not easy to reduce costs and difficult to enhance its mobility and flexibility.

In fact, the one who needs better air circulation and quality is the user himself or herself. Therefore, an air circulator in compact and portable size that the user may carry or place near the user is the real need to the user. It is especially a good idea for the user to improve the air circulation and quality in his or her office or working environment with his or her own air circulator placed around.

The conventional air circulation device contains parts and components for controlling the air flow which are heavy and large in size that causes much inconvenience to the device. When air purification is required, the relative position and arrangement of the filter is really important that the interference between the circulation and filtration must be avoided. It is even better to have a design facilitating the air circulation. In other words, both the air flow controlling components and filter element need to have a break-through in the currently defective technology and provide a design and consideration in overall manner vision so as to fulfill the demands in the market.

SUMMARY OF THE PRESENT INVENTION

The invention is advantageous in that it provides an air circulator which guides the air to flow in conversion direction before discharging so as to increase the mobility and fluidity of the flowing air and improve the quality of the air.

Another advantage of the invention is to provide an air circulator, wherein the flowing air is guided to turn and flow through a flowing path from bottom to top, wherein the flowing path has a turning corner with a predetermined turning angle to improve the air mobility and fluidity by changing the flowing direction of flowing air.

Another advantage of the invention is to provide an air circulator which collects outside air at a lower portion thereof and discharges the air upwardly in a spiral manner, wherein the inletting air from the bottom is sucked and driven to flow upwardly and spirally for a farer distance to increase the circulation range thereof.

Another advantage of the invention is to provide an air circulator providing better air purifying effect by enabling the inletting air to be deposited at the turning corner and, in addition, providing a filter element at the turning corner for high-efficient filtering.

Another advantage of the invention is to provide an air circulator that purifies inletting air at the lower portion and upwardly sucks and delivers the purified air to discharge so as to reduce the possibility of repeatedly purifying the purified air and thus enhance the air purification efficiency of the environment.

Another advantage of the invention is to provide an air circulator, wherein the inletting air is purified and delivered upwards to discharge purified air up to a position with a predetermined height to meet the actual living need of people without the need to elevate the placing height of the air circulator.

Another advantage of the invention is to provide an air circulator comprising at least a filter unit which can be detached from a lower portion thereof by directly removal operation without lateral movement or shaking, so as to avoid adverse effect to the surrounding environment and reduce the possibility of secondary air pollution while replacing the filter unit.

Another advantage of the invention is to provide an air circulator comprising a power assembly at a lower position that guides the air to deliver upwards from bottom to top while the filter unit is provided at the lower portion lower than the power assembly to provide a relatively clean working environment for the power assembly that decreases the cleaning cycle and increases the service life of the air circulator.

Another advantage of the invention is to provide an air circulator which power assembly is disposed along an outletting direction of the air being guided to flow to avoid interference to air filtration, that improves the mobility and fluidity of the air without affecting its filtration effect.

Another advantage of the invention is to provide an air circulator which comprises a control panel for the power assembly provided on a top side of the air circulator, adjacent to the outlet of the discharging air, to facilitate the controlling operation of the power assembly while reducing adverse effect of the flowing air by the power assembly and ensuring the strengthen of the mobility and fluidity of the flowing air.

Another advantage of the invention is to provide an air circulator, wherein the electrical wiring of the power assembly is arranged in compact configuration to reduce the influence of the air flowing path, minimize the occupying space of the power assembly, and increases the reliability and stability of electrical wiring of the power assembly.

Another advantage of the invention is to provide an air circulator, wherein both the arrangement of the electrical wiring and the supporting mechanism of the power assembly provide a guiding effect to the flowing air that assists the guidance of pushing the outletting flowing air.

Another advantage of the invention is to provide an air circulator which can provide additional functions, such as humidification, fragrance, and etc., by replacing the filter with other functional unit or by using a filter with additional function.

Another advantage of the invention is to provide an air circulator having a light weight and compact size for ease of carrying and placing in various locations in a room to promote air circulation in different regions of the room that prevents the use of the high power and the waste of energy.

Additional advantages and features of the invention will become apparent from the description which follows, and may be realized by means of the instrumentalities and combinations particular point out in the appended claims.

According to the present invention, the foregoing and other objects and advantages are attained by an air circulator, which comprises:

an airflow guiding housing having an airflow channel extending between an air inlet formed at a lower peripheral side of the air flow guiding housing for air flowing in radially into the airflow channel and an air outlet formed at a top side of the airflow guiding housing for air discharging out upwardly from the airflow channel, wherein the airflow channel has a purifying chamber positioned at a lower portion thereof and adjacent to the air inlet and a guiding chamber positioned at an upper portion thereof and adjacent to the air outlet, wherein the airflow channel has an airflow turning portion in the purifying chamber where the air flowing in via the air inlet turns a predetermined angle into the guiding chamber; and a power assembly, installed in the airflow channel of the airflow guiding housing, providing a suction power to drive the air flowing into the airflow channel through the air inlet and deliver the air flowing out the airflow channel through the air outlet, wherein the air flowing through the airflow channel is guided to turn the predetermined angle at the airflow turning portion in the purifying chamber.

According to a preferred embodiment of the present invention, the air circulator further comprises an air filter installed in the purifying chamber for filtering the air flowing in through the air inlet before flowing into the guiding chamber.

According to a preferred embodiment of the present invention, the power assembly comprises a power supply, a fan unit, a control unit, and a control panel, wherein the control unit controls the fan unit to receive power from the power supply, wherein the control panel is operated to determine a controlling manner of the control unit.

According to one embodiment of the present invention, the fan unit is coaxially in the airflow diversion housing.

According to one embodiment of the present invention, the fan unit is positioned in the airflow guiding chamber of the airflow channel of the airflow guiding housing.

According to one embodiment of the present invention, the control panel is disposed on a central portion of the top side of the airflow guiding housing while the air outlet is positioned surrounding the control panel on the top of the airflow guiding housing.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
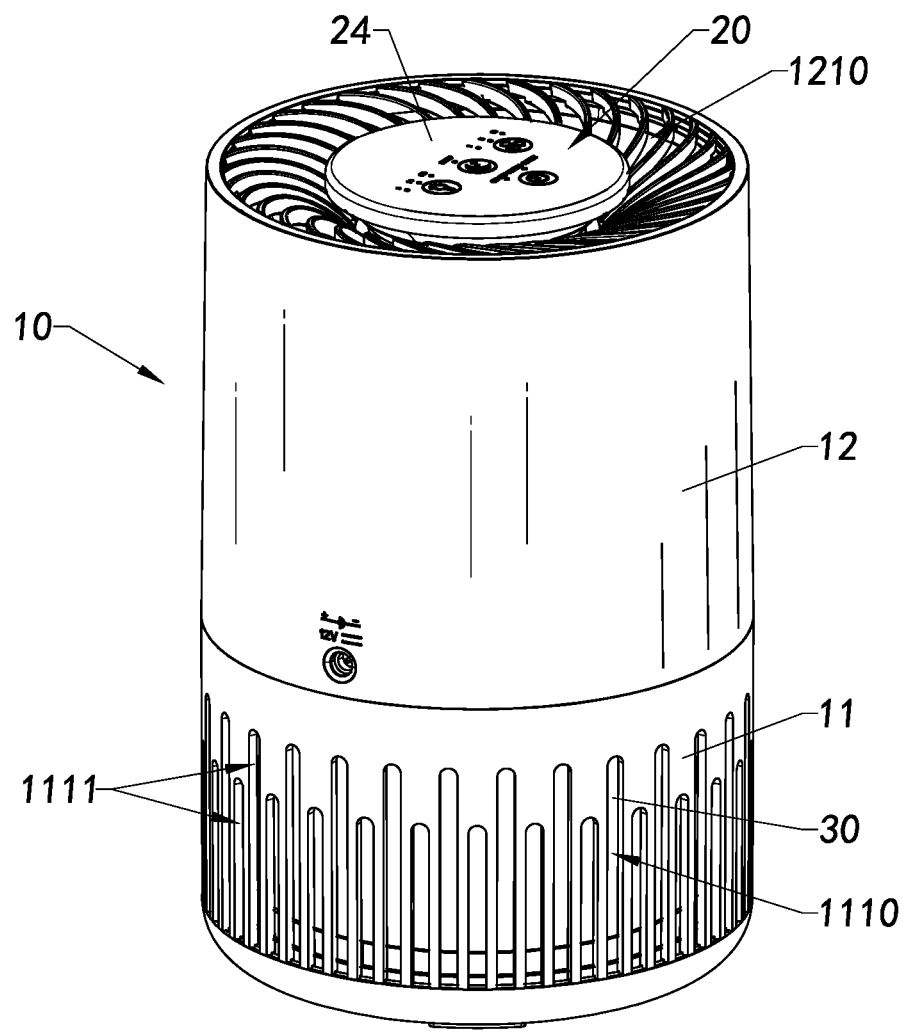
FIG. 1 is a perspective view of an air circulator according to a preferred embodiment of the present invention.

The following description is disclosed to enable any person skilled in the art to make and use the present invention. Preferred embodiments are provided in the following description only as examples and modifications will be apparent to one skilled in the art. The general principles defined in the following description would be applied to other embodiments, alternatives, modifications, equivalents, and applications without departing from the spirit and scope of the present invention.

Referring to FIGS. 1 to 6 of the drawings, the present invention provides an air circulator, which comprises an airflow guiding housing 10 and a power assembly 20 installed in the airflow guiding housing 10. The airflow guiding housing 10 has an air inlet 1110 formed at a lower peripheral side thereof, an air outlet 1210 formed at a top side thereof and an airflow channel 100 extending from the air inlet 1110 to the air outlet 1210 in the airflow guiding housing 10. The power assembly 20 comprises a power supply 21, a fan unit 22, a control unit 23, and a control panel 24

When the power assembly 20 is operated to activate by electrical power to suck air into the airflow channel 100, surrounding air near the air inlet 1110 is driven into the airflow channel 100 through the air inlet 1110 radially and flows upwardly from the bottom of the airflow guiding housing 10. The airflow channel 100 has an airflow turning portion 1001 where the inletting air through the air inlet 1110 will turns a predetermined angle and flow upwardly towards the air outlet 1210 to discharge from the airflow guiding housing 10. In other words, the power assembly 20 guides the air outside the airflow guiding housing 10 to flow into the airflow guiding housing 10 via the air inlet 1110 and flow towards the air outlet 1210 along the airflow channel 100, wherein the radially inletting air will be guided by the airflow channel 100 to turn a predetermined angle to flow longitudinally and upwardly towards the air outlet 1210 to discharge while maintaining the mobility and fluidity of the air flow.

Since the airflow channel 100 is started from a radial direction of the airflow guiding housing 10 and ended with an axial direction of the airflow guiding housing 10, the flowing air will turn a predetermined angle at the airflow turning portion 1001 of the airflow channel 100 due to the suction force provided by the power assembly 20 and the guidance of the airflow channel 100. In other words, the air is pushed from the bottom of the airflow guiding housing 10 and delivered to the top of the airflow guiding housing 10 by the power assembly 20 installed in the airflow guiding housing 10.

Figure 3:
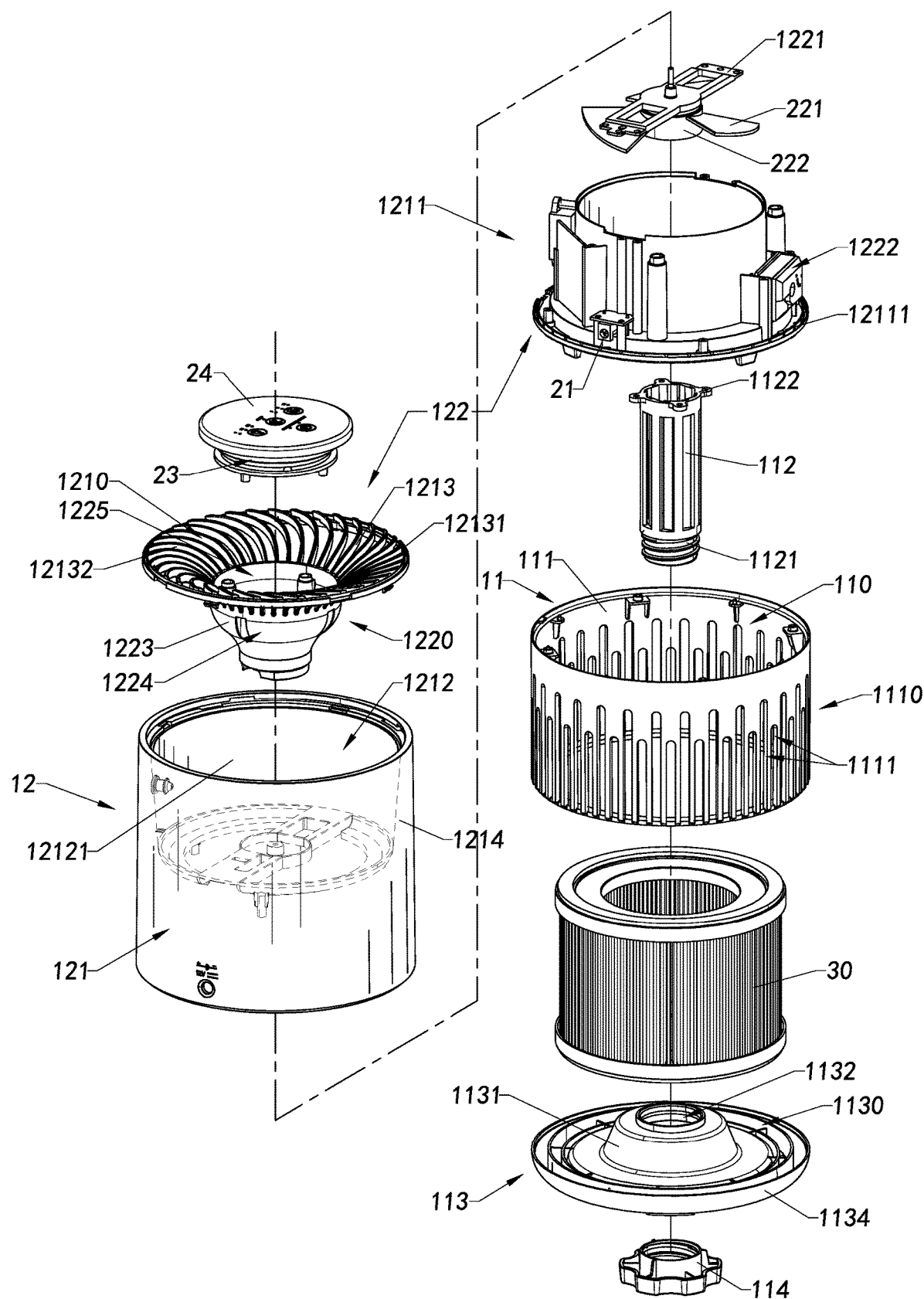
FIG. 3 is an exploded view of the air circulator according to the above preferred embodiment of the present invention.
Figure 4:
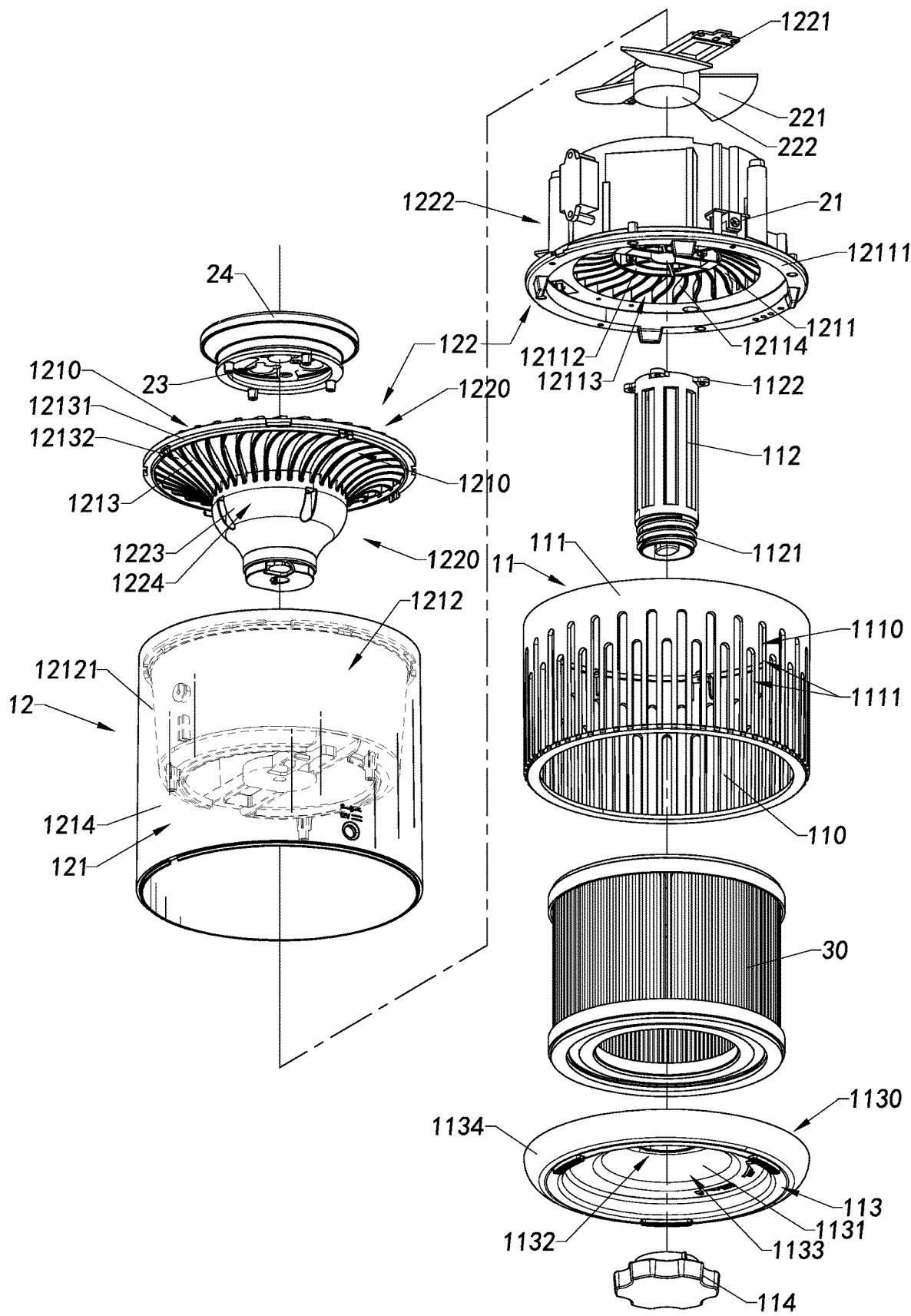
FIG. 4 is another exploded view of the air circulator according to the above preferred embodiment of the present invention.
Figure 5:
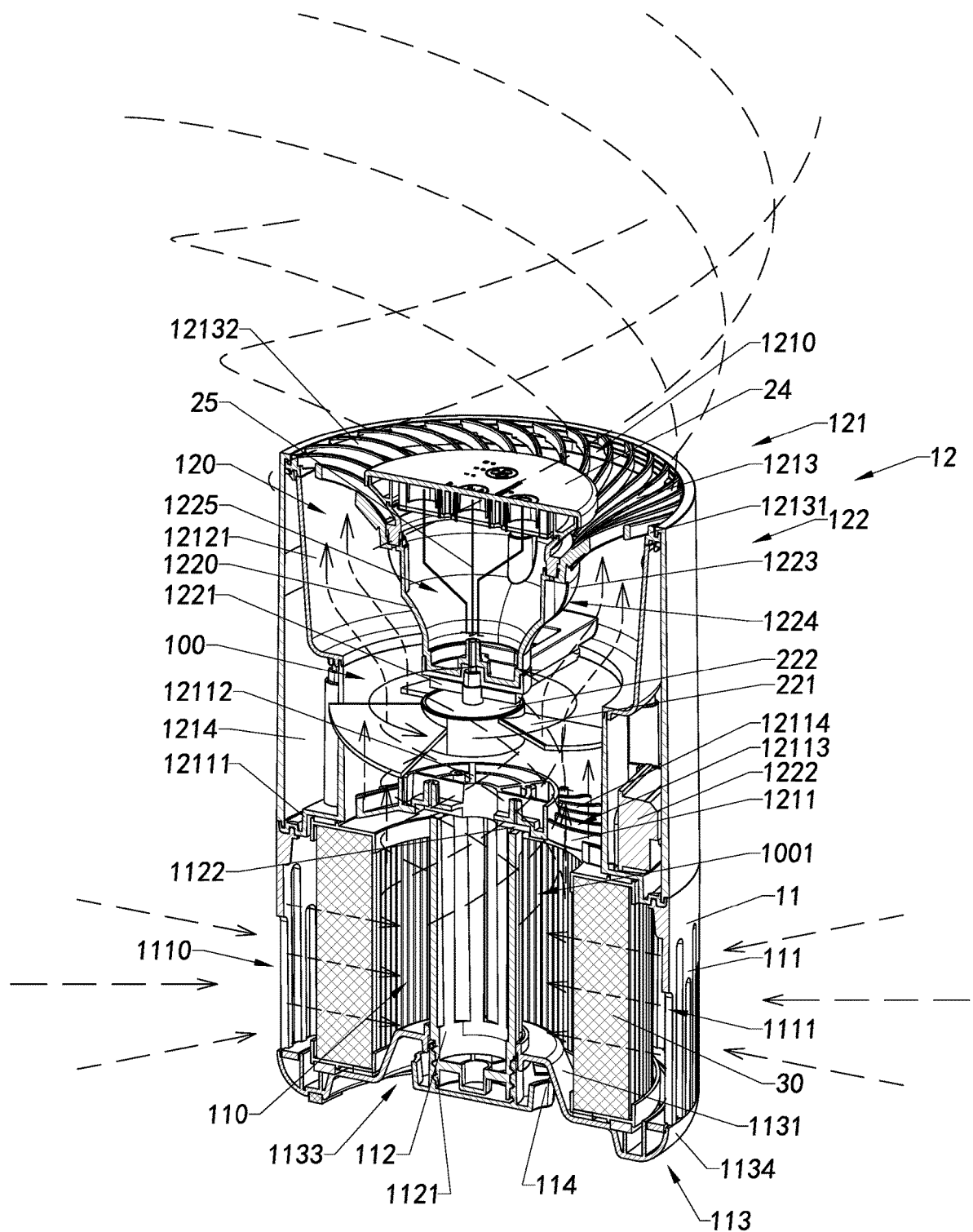
FIG. 5 is a sectional perspective view of the air circulator, illustrating of the air flowing path, according to the above preferred embodiment of the present invention.

Referring to FIGS. 3 to 5, according to the preferred embodiment of the present invention, the airflow channel 100 has a purifying chamber 110 positioned at a lower portion thereof having an inlet end adjacent to the air inlet 1110 and a guiding chamber 120 positioned at an upper portion thereof having an outlet end adjacent to the air outlet 1210, wherein the airflow turning portion 1001 is provided in the purifying chamber 110 of the airflow channel adapted for guiding the air flowing in via the air inlet 1110 turns a predetermined angle into the guiding chamber 120. The power assembly 20 is installed in the airflow channel 100 of the airflow guiding housing 10, providing a suction power to drive the air flowing into the airflow channel 100 through the air inlet 1110 and deliver the air flowing out the airflow channel 100 through the air outlet 1210, wherein the air flowing through the airflow channel 100 is guided to turn the predetermined angle at the airflow turning portion 1001 in the purifying chamber 110.

Furthermore, according to the preferred embodiment, although the flowing air is guided to turn the predetermined angle, form radially to upwardly, at the airflow turning portion 1001 which can provide an air purifying effect that dust particles heavier than air will fall and precipitate to the bottom of the airflow guiding housing 10 during the angle turning of the air flowing, the air circulator is adapted to further comprise an air filter 30 disposed in the bottom of the airflow guiding housing 10 and positioned in the purifying chamber 110 adjacent to the air inlet 1110, so that the air flowed into purifying chamber 110 through the air inlet 1110 is immediately forced to flow through the air filter 30 and thus filtered by the air filter 30 before flowing through the airflow turning portion 1001, as shown in FIGS. 4 and 5. It is worth mentioning that the air filter 30 in the preferred embodiment of the present embodiment comprises a top ring, a bottom ring and an annular shape filtering component sandwiched and supported between the top ring and the bottom ring to define a circular outer surface and a circular inner surface for removal of dust, particles and the like in the air while the air is flowing from outer surface to the inner surface of the filtering component so as to further purify the inletting air. Since the filtering component of the air filter 30 can be made of material for air humidification or air purification and the like, the air discharged from the airflow channel 100 could be purified and obtain different purifying results based on the type of air filter 30 to be used in the air circulator of the present invention. For illustration, the air filter 30 is employed as an example in this embodiment. One skilled in the art may be understood that the other types of the air filter 30 may be chosen according to the need of the air purification.

According to the preferred embodiment, the power assembly 20 is installed in the airflow channel 100 of the airflow guiding housing 10 and positioned on top of the purifying chamber 110 to provide a suction power to drive the air flowing into the airflow channel 100 via the air inlet 1110 and deliver the air flowing out the airflow channel 100 through the air outlet 1210.

According to the preferred embodiment, the airflow guiding housing 10 is in cylindrical shape and adapted for receiving the air filter 30 at the bottom of the airflow guiding housing 10. In particular, the air filter 30 is disposed in an outer corner portion of the purifying chamber 110 of the airflow channel 100 while its outer ring surface is adjacent to the air inlet 1110 which has a plurality of inlet slots 1111 spacedly and vertically formed in a lower peripheral side of the airflow guiding housing 10, wherein the inner space surrounding by the inner surface of the air filter 30 in the purifying chamber 110 forms the airflow turning portion 1001 of the airflow channel 100, such that the outside air radially and traversely flowing in via the air inlet 1110 and passing through air filter 30 enters the airflow turning portion 1001 and the suction force of the power assembly 20 mounted above the air filter 30 will force and drive the purified air to turn the predetermined angle (i.e. 90 degrees) and flow upwardly and vertically into the guiding chamber 120.

In other words, the flowing path of the air is arranged to change direction at the airflow turning portion 1001 of the airflow channel 100 after the filtration of the air filter 30 that substantially helps the purification of the air and slows down the flowing speed of the air within the airflow channel 100 before flowing into the guiding chamber 120. It is worth mentioning that, due to the coaxial arrangement of the airflow channel 100 with the airflow guiding housing 10 while the air inlet 1110 is formed at the lower peripheral side of the airflow guiding housing 10 and the air outlet 1210 is formed at the top side of the airflow guiding housing 10, the airflow guiding housing 10 can be constructed simply in cylindrical shape and the power assembly 20 can be mounted simply along the airflow channel 100 that minimizes the size of the air circulator and enables the air filter 30 to be installed in the purifying chamber 110 adjacent to the air inlet 1110 to filter the inletting air immediate from the air inlet 1110 and drive the filtered air to turn from traverse direction to axial direction and flow out through the air outlet 1210 without increasing the complexity of the air filter 30 and the air circulator while improving the air purifying efficiency of the air circulator of the present invention.

Referring to FIGS. 1 to 5, the airflow guiding housing 10 comprises an annular hollow inlet case 11 and an annular hollow outlet case 12, wherein the purifying chamber 110 is provided in the inlet case 11 and the guiding chamber 120 is provided in the outlet case 12 and communicated with the purifying chamber 110 to form the airflow channel 100. The power assembly 20 is arranged in the outlet case 12 and the air filter 30 is placed in the inlet case 11. Therefore, the power assembly 20 is arranged on top of the air filter 30, that is the location of the power assembly 20 is relatively higher than the air filter 30. When the power assembly 20 is actuated, the air is collected into the purifying chamber 110 of the inlet case 11 through the air inlet 1110 and delivered to guiding chamber 120 of the outlet case 12 to discharge out of the airflow guiding housing 10 through the air outlet 1210 provided on top of the airflow guiding housing 10 under suction force of the power assembly 20. It is worth to mention that, according to the preferred embodiment, the air filter 30 is detachably placed in the inlet case 11 and positioned relatively lower than the power assembly 20 for purifying inletting air within the inlet case 11 before flowing through the power assembly 20 to the air outlet 1210 in the outlet case 12 to keep a clean environment for the power assembly 20 and that, even when the power assembly 20, the air before purifying or to be purified is remained in the inlet case 11 where close to the location the air filter 30 is disposed. Once the power assembly 20 is actuated, the air is collected in the inlet case 11 and filtered by the air filter 30 before delivering to the outlet case 12 and discharging via the airflow outlet 1210 provided on top of the outlet case 12. In other words, the air to be filtered and the filtered air are separated in the relative lower and upper positions, i.e. the inlet case 11 and the outlet case 12, so as to enhance the overall purifying effect and avoid complicated multiple filtrations.

Figure 2:
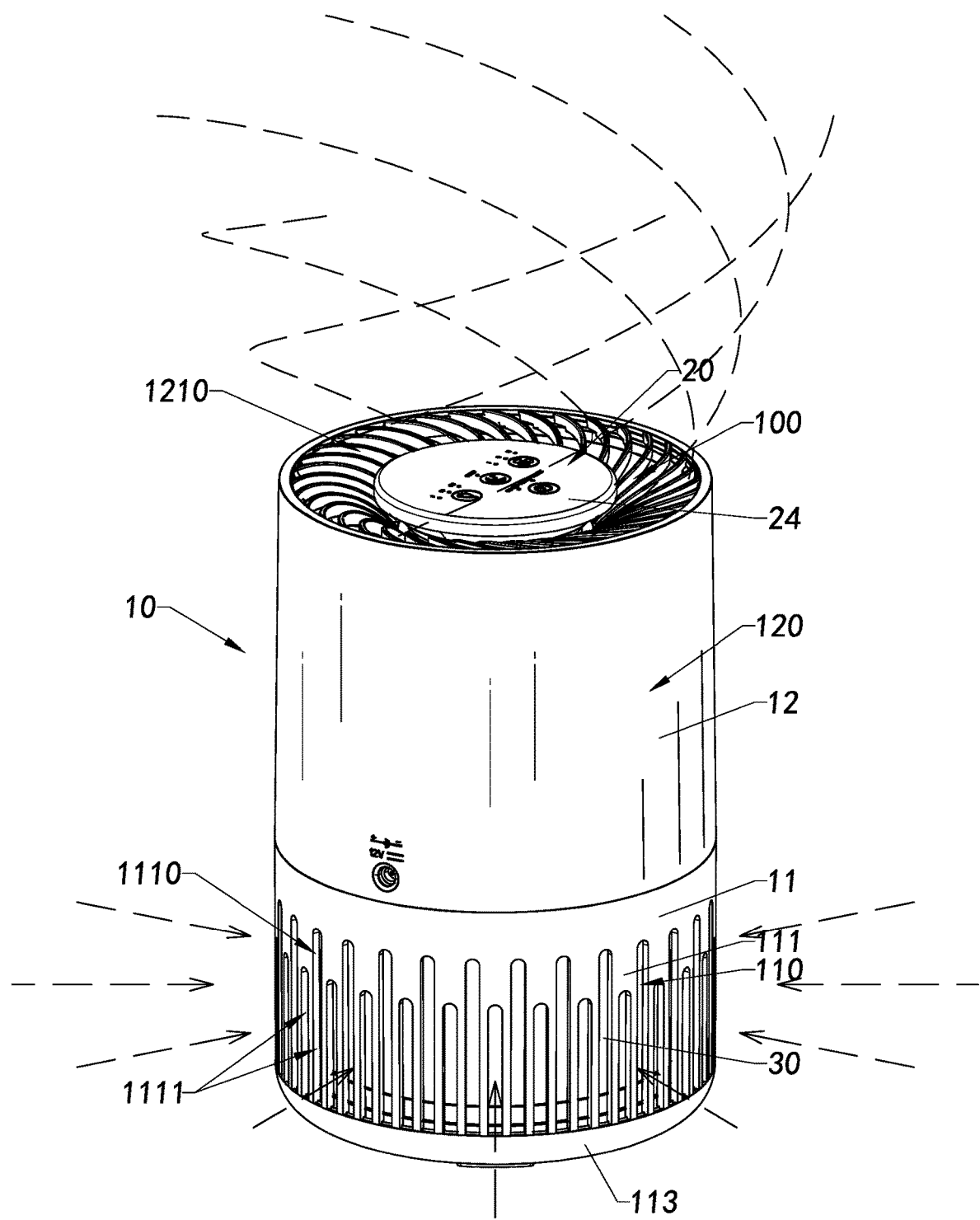
FIG. 2 is a schematic view of the air circulator, illustrating an air flowing path of the air circulator, according to the above preferred embodiment of the present invention.

In the preferred embodiment, referring to FIG. 2, the air is drawn into the inlet case 11 radially by the power assembly 20 and is discharged out of the outlet case 12 upwardly. The air inlet 1110 which is provided around the outer peripheral side of the inlet case 11 is the starting position of the airflow channel 100. The air outlet 1210 which is provided on the top side of the outlet case 12 is the ending position of the airflow channel 100. Moreover, the outlet case 12 provides a spiral flowing guide for the flowing air so that the air can be guided to flow out of the airflow channel 100 upwardly, outwardly and helically in a spiral manner, as illustrated in the dotted lines in FIG. 2.

When the power assembly 20 is operated to be actuated, air outside the inlet case 11 is sucked and collected into the purifying chamber 110 through the air inlet 1110, and the inletting air is drawn to flow through the purifying chamber 110 and to turn from traverse direction to upward direction at the airflow turning portion 1001 of the purifying chamber for purification by deposition and/or filtration through the air filter 30. Then, the power assembly 20 will draw and deliver the purified air into the guiding chamber 120, wherein the purified air will be guided to flow upwardly through the guiding chamber 120 in the spiral manner and discharge out of the outlet case 12 through the air outlet 1210 provided on top of the outlet case 12.

More specifically, the outlet case 12 comprises a guiding frame 121 and a power supporting frame 122, as shown in FIGS. 3 to 5. The power supporting frame 122, which is a hollow cup shape frame body 1220 having a larger upper end, a smaller lower end and an inclined outer guiding surface 1224 extending upwardly and outwardly from the lower end to the upper end and defining a receiving cavity 1225 therein, is securely supported at an upper portion of the outlet case 12 by means of the guiding frame 121 such that the space between an outer surface of the power supporting frame 122 and the guiding frame 121 defines as the guiding chamber 120.

Furthermore, as shown in FIGS. 3 and 4, the fan unit 22 of the power assembly 20n is under control of the control unit 23 and power supplied by the power supply 21 electrically, wherein the control panel 24 is electrically connected to the control unit 23 and adapted to provide operating instructions to the control unit 23. The control panel 24 is disposed on top of the control unit 23 which is mounted to the upper end of the power supporting frame 122. The fan unit 22 is mounted to the lower end of the power supporting frame 122 so that electric wirings 25 that electrically connect the control unit 23 with the fan unit 22 can be concealedly and securely extended inside the receiving cavity 1225, so that the control panel 24 can be operated directly to input control operation to the control unit 23 to control the actuation and operation of the fan unit 23. The fan unit 22 is controlled by the control unit 23 to obtain electric energy from the power supply 21. When the control panel 24 is operated to input to the control unit 23 by the user to activate the power assembly 20, the fan unit 22 is powered by the power supply 21 to be driven to rotate. After actuating the fan unit 22, a suction force is provided by the rotating fan unit 22 to draw air to flow from bottom to top in the airflow channel 100.

More specifically, the fan unit 22 comprises a blade unit 221 and a motor 222 which is connected to the blade unit 221 and controlled by the control unit 23 to drive the blade unit 221 to rotate to provide the suction force for drawing air from bottom to top upwardly.

In other words, the rotation speed, the rotation direction and other performance of the motor 222 and the fan unit 221 can be set by operating the control panel 24. The blade unit 221 is driven by the motor 222 is rotated to drive the air flowing in the airflow channel 100.

Referring to FIGS. 3 and 4, according to the preferred embodiment, the inlet case 11 comprises a surrounding shell 111 having an annular and tubular shape and a bottom base 113 detachably mounted to a bottom end of the surrounding shell 111 to define the purifying chamber 110 within the surrounding shell 111 and the bottom base 113. The air inlet 1110 is formed around the surrounding shell 111 and the plurality of inlet slots 1111 of the surrounding shell 111 is spacedly and vertically formed in at least a portion of the surrounding shell 111 communicating the purifying chamber 110 with outside for air outside flowing into the purifying chamber 110. According to the preferred embodiment, the inlet slots 1111 are preferred to be formed and distributed all round the peripheral surface of surrounding shell 111 to ensure the air to be drawn into the purifying chamber 110 as much as possible. The top end of the surrounding shell 111 is arranged to be sealedly secured to a bottom end of the outlet case 12 so that the guiding chamber 120 within the outlet case 12 and the purifying chamber 110 within the inlet case 11 are combined to form the airflow channel 100. The air filter 30 is placed inside the surrounding shell 111 and covered by the bottom base 113 to secure the air filter 30 within the purifying chamber 110. The bottom base 113 has an annular base groove 1130 formed in an inner side for stably keeping the air filter 30 to be disposed in the purifying chamber 110 in position.

In other alternative modes, other types of air filter 30 may be used and disposed in the base groove 1130 of the bottom base 113. For example, the air filter 30 can be a wet-type filter, a fragrance type filter and etc. To a wet-type filter, the filtering component of the air filter is soaked with fluid such as water to contain a predetermined moisture so that when the air flowing therethrough will increase its humidity, To a fragrance type filter, the air filter 30 as shown in drawings is replaced by simply adding water, flavor additives, or etc. into the base groove 1130 to add moisture to the inletting air before turning direction to flow up at the airflow turning portion 1001. Of course, the fragrance type filter can be used with the air filter 30 at the same time, wherein in addition to the air filter 30 disposed in the purifying chamber 110, water or favor additives are added in the base groove 1130.

The inlet case 11 further comprises a central connector 112 and a fastener 114. The central connector 112 has an elongated shank having a length generally equal to the height of the surrounding shell 111 of the inlet case 11, a threaded first end 1121 coaxially extended out a central hole 1132 of the bottom base 113 to be fastened by the fastener 114 and a second end 1122 coaxially extended upwardly and configured to be coaxially secured to the bottom of the outlet case 12. The fastener 114 is a nut body adapted to screw with to the first end 1121 of the central connector 112 so as to stably affixed the bottom base 113 with the surrounding shell 111 to form the inlet case 11 and fastened the inlet case 11 with the outlet case 12 while holding the air filter 30 within the purifying chamber 1110 of the inlet case 11.

Simply by tightening the screwing of the first end 1121 of the central connector 112 with the fastener 114, not only the bottom base 113 is securely connected with the surrounding shell 111 to cover the purifying chamber 110 within the surrounding shell 111, the inlet case 11 can also be tightly fastened with the outlet case 12 coaxially to form the airflow guiding housing 10 at the same time while the space around the central connector 112 within the surrounding shell 111 is covered by the bottom base 113 and defined as the purifying chamber 110 for enabling the air filter 30 to be disposed therein and allowing the inletting air drawn in though the air inlet 1110 to flow through the air filter 30 radially for air purification and turn a flowing direction upwardly into the guiding chamber 120 at the airflow turning portion 1001 defined between the inner surface of the air filter 30 and the outer cylindrical wall of the central connector 112.

Simply by unscrewing the fastener 114 from the first end 1121 of the central connector 112, the bottom base 113 is can be detached from surrounding shell 111 to open the purifying chamber 110 so that one can remove or replace the air filter 30, add water or additive in the base groove 1130 of the bottom base 113, detach the inlet case 11 with the outlet case 12 by disconnecting the second end 1122 of the central connector 112 with the outlet case 12 for cleaning or repairing purpose.

Preferably, referring to FIGS. 3 and 4, the bottom base 113 has a convex central portion 1131 having the central hole 1132 therein and defining a central bottom cavity 1133 below the bottom base 113 for completely receiving the fastener 113 screwed to the first end 1121 of the central connector 112 therein, wherein the height of the central portion 1131 is higher than a peripheral rim 1134 of the bottom base 113 while the annular base groove 1130 is formed between the central portion 1131 and the peripheral rim 1134 and a distance between the central portion 1131 and the peripheral rim 1134 is preferred to be equal to or slightly larger than a thickness of the air filter 30 so that the air filter 30 can fittingly sit and be retained therein, as shown in FIG. 5, wherein the tip of the central portion 1131 is upwardly extended into the bottom end of the central cylindrical hole of the air filter 30 that substantially holds the air filter 30 in position without the need of any additional holding component. Also, the first end 1121 of the central connector 112 penetrated through the central hole 1132 is extended into the central bottom cavity 1133 so that the first end 1121 and the fastener 113 tightly screwed to the first end 1121 of the central connector 112 are both completed received in the central bottom cavity 1133, allowing the bottom base 113 of the air circulator to be flatly and stably placed on a surface.

After the fan unit 22 of the power assembly 20 is actuated to rotate, the flowing air is drawn and guided upwardly and outwardly within the guiding chamber 120 from the purifying chamber 110. It is worth mentioning that the power supporting frame 122 separates the guiding chamber 120 with the electrical components, including the control unit 23 and the power supply 21 of the power assembly 20. In other words, the fan unit 22 is supported in the guiding chamber 120 by the power supporting frame 122 to drive and guide the air flowing through the guiding chamber 120 while the electrical components, electric wiring 25 and other circuit elements are isolated and concealed in the power supporting frame 122 from the guiding chamber 120 of the airflow channel 100, without affecting or blocking the flowing path of the air, so as to stabilize and effectively guide the air flow along the airflow channel 100, enhance the reliability of the power assembly 20 and prolong the service life span of the air circulator.

As shown in FIG. 2 to FIG. 4, the guiding frame 121 of the outlet case 12 comprises a cylindrical hollow outer case shell 1214 having a diameter preferably equal to the diameter of the surrounding shell 111 of the inlet case 11, so that the bottom end of the guiding shell 121 is coaxially connected to the top end of the surrounding shell 111 of the inlet case 11, the inlet case 11 and the outlet case 12 form the air circulator in cylindrical shape as shown in FIGS. 1, 2 and 5. The guiding frame 121 of the outlet case 12 further comprises a support frame 1211, a guiding wall 1212 and an outlet frame 1213 successively installed from bottom to top in guiding frame 121 of the outlet case 12.

The support frame 1211 is a tubular frame having a diameter smaller than that of the guiding shell 121 and a height shorter than the height of the guiding frame 121, such that the support frame 1211 is adapted to be mounted on a lower portion inside the case shell 1214, as shown in FIG. 5, wherein a bottom circular peripheral rim 12111 of the support frame 1211 is connected to a bottom end of the case shell 121 and the surrounding shell 111 of the inlet case 11 while the top end of the surrounding shell 111 of the inlet case 11 adapted to be connected to the bottom end of the case shell 1214 sandwiching the peripheral rim 12111 of the support frame 1211 therebetween. The bottom end of the support frame 1211 further comprises a central hub 12112 and a guiding inlet 12113 defined by a plurality of airflow guiding ribs 12114 spacedly and helically extending from a circumferential outer side of the central hub 12112 to the peripheral rim 12111 of the support frame 1211 defining the interior chamber of the support frame 1211 as a lower half of the guiding chamber 120 and communicating with the purifying chamber 110 of the inlet case 11 through the guiding inlet 12113, wherein the second end 1122 of the central connector 112 is coaxially fastened to central hub 12112 while connecting the inlet case 11 with the outlet case 12.

It is worth mentioning that, when the air filter 30 is installed in the purifying chamber 110, the lower half of the guiding chamber 120 defined by the support frame 121 has a volume larger than that of the interior space defined between the central connector 112 and the inner surface of the air filter 30, that would additionally provide a suction force for and speed up the air flowing from the purifying chamber 110 into the guiding chamber 120, which also enhances the drawing force to drive the air entering from the air inlet 1110 to pass through the air filter 30 into the airflow turning portion 1001 of the purifying chamber 110.

The outlet frame 1213 comprises a circular outer outlet rim 12131 adapted to be connected to the top end of the case shell 1214 of the outlet case 12, as shown in FIG. 1 to FIG. 5, and a plurality of airflow outlet ribs 12132 spacedly and helically extended from the top end of the cup shape frame body 1220 of the power supporting frame 122 to the outer outlet rim 12131. To enhance a spiral effect for the outletting air of the air circulator to flow upwardly and outwardly so as to increase the covering space above the air circulator of the present invention for better air circulation, according to the present invention, the airflow outlet ribs 12132 are preferred to be also gradually extended upwardly and spirally as shown in FIG. 3 to FIG. 5, wherein the inner ends of the airflow outlet ribs 12132 are integrally extended from the outer edge of the top end of the power supporting frame 122 so that the outlet frame 1213 and the power supporting frame 122 form an integral body functioning as a top side of the outlet case 12 while the gaps between the airflow outlet ribs 12132 forming the air outlet 1210 of the airflow guiding housing 10. Alternatively, it is apparent to person skilled in the art to provide an outlet frame 1213 further comprises a circulator inner outlet rim for connecting to the top end of the power supporting frame 122 and the airflow outlet ribs 12132 are extended between the inner outlet rim to the outer outlet rim 12131.

The guiding wall 1212, as shown in FIG. 3 to FIG. 5, is tubular body having a smaller circular bottom end adapted to be connected to the circumferential top end of the support frame 1211 and a larger circular top end adapted to be coupled with the top end of the guiding frame 121 by connecting to the outer outlet rim 12131 of the outlet frame 1213, so as to dispose in an upper portion inside the guiding frame 121. An inner surface of the guiding wall 1212 is upwardly and outwardly extended from its circular bottom end to its circular top end to define an inclined airflow guiding surface 12121 and an interior chamber therein as an upper half of the guiding chamber 120 which combines with the lower half of the guiding chamber 120 defined within the support frame 1211 to form the whole guiding chamber 120 in the outlet case 12.

In other words, the axes of the power supporting frame 122 and the support frame 1211 are aligned to the second end 1122 of the central connector 112 of the inlet case 11. The bottom end edge of the guiding wall 1212 is connected to the support frame 1211, and the top end edge is connected to the outlet frame 1213. Due to the arrangement of the airflow guiding ribs 12114 and the guiding inlet 12113 of the guiding frame 1211, the air driven by the fan unit 22 of the power assembly 20 from the purifying chamber 110 will be guided by the airflow guiding ribs 12114 to flow into the guiding chamber 120 through the guiding inlet 12113 in a helical manner and be guided by the airflow guiding surface 12121 of the guiding wall 1212 to flow out through the airflow outlet 1210 provided in the outlet frame 1213. Such helical flow of the air in the guiding chamber 120 not only can speed up the air flow, but also can enhance the suction force of the fan unit 22 to draw air flowing from the purifying chamber 110 and help the air to flow up and discharge through the air outlet 1210 on top of the airflow guiding housing 10.

The blade unit 221 of the fan unit 22 is rotatably mounted to the motor 222 of the fan unit 22. The power supporting frame 122 comprises a blade supporter 1221 for rotatably supporting the blade unit 221 of the fan unit 22 with bearing mechanism so that the blade unit 221 can be driven to rotate by the motor 222. The power supporting frame 122 further comprises a power supporter 1222 arranged to be mounted on an outer side of the support frame 1211 for supporting the power supply 21 which is electrically connected with the motor 222 to supply electric power. The top end of the cup shape frame body 1220 of the power supporting frame 122 forms a panel supporter 1223 allowing the control unit 23 mounted thereon while the control panel 24 is attached on top of the control unit 23, as shown in FIG. 5, wherein the control unit 23 and the control panel 24 not only cover the receiving cavity 1225 of the power supporting frame 122, but also are supported at the topmost position of the airflow guiding housing 10 that facilitates the user to operate and control the power assembly 20. Therefore, at the same time while the user uses one hand to operate the control panel 24, the same hand can feel the power of air flowing at the air outlet 1210 around the control panel 24, as shown in FIG. 2. It is worth mentioning that the panel supporter 1223 is also adapted to support the motor 222 of the fan unit 22, or that the motor 222 of the fan unit 22 can also be integrated to the blade unit 221, while the fan unit 22 is electrically connected to the control unit 23 through electric wiring 25 disposed and concealed in the receiving cavity 1225 of the power supporting frame 122. In other embodiment, when the power supply 21 further comprises one or more dry cells or batteries, the dry cells or batteries may simply received in the receiving cavity 1225 of the power supporting frame 122 too.

Referring to FIG. 3 to FIG. 5, the fan unit 22 is rotatably and coaxially connected to the first end 1221 of the cup shape frame body 1220 of the power supporting frame 122 by the blade supporter 1221, wherein the cup shape frame body 1220 of the power supporting frame 122 is supported by the outlet frame 1213 to be disposed coaxially in the upper half of the guiding chamber 120 defined inside the guiding wall 1212 and the first end 1221 of the cup shape frame body 1220 of the power supporting frame 122 is extended into the top end of the support frame 1211 so that the fan unit 22 is disposed and arranged to be actuated to rotate within the lower half of the guiding chamber 120 inside the support frame 1211, so as to provide a suction force to draw air flowing from the purifying chamber 110 into the guiding chamber 120.

As mentioned above, the power supporter 1222 can be affixed on the support frame 1211 and provided on the outside of the guiding wall 1212 while the guiding chamber 120 is formed inside the support frame 1211 and the guiding wall 1212. In particular, according to the preferred embodiment, the power supporter 1222 is integrally molded on the support frame 1211 outside the guiding chamber 120. In other words, the power supply 21 contained in the power supporter 1222 is isolated from the guiding wall 1212 and the guiding chamber 120, so as to avoid interaction between the flowing air and other electrical components.

In addition, the blade supporter 1221 which is adapted to affix the blade unit 221 of the fan unit 22 in the support frame 1211 in position forms a bridge to electrically connect the power supply 21 in the power supporter 1222 with the motor 222 of the fan unit 22 for providing electric power to actuate the motor 222 to drive the blade unit 221 to rotate to provide a balance suction force in the lower half of the guiding chamber 120 to draw air flowing from the purifying chamber 110 into the guiding chamber 120 of the airflow channel 100.

Preferably, the blade supporter 1221 is designed to be mounted relatively on the first end 1221 of the cup shape frame body 1220 of the power supporting frame 122 within the guiding chamber 120, so the air in the purifying chamber 110 is driven to flow upwardly into the guiding chamber 120 by the rotating blade unit 221 that also provides a suction force in the purifying chamber 110 to draw air from outside into the purifying chamber 110 through the air inlet 1110. In other words, the blade unit 221 is placed in a central position of the airflow channel 100. Of course, depending on the design, the position of the blade unit 221 may be adjusted by the position of the blade supporter 1221.

According to the preferred embodiment, the blade supporter 1221 is mounted on the bottom end of the cup shape frame body 1220 of the power supporting frame 122, wherein the control unit 23 is mounted on the panel supporter 1223 which is the upper portion of the cup shape frame body 1220 of the power supporting frame 122 and electrically connected to the motor 222 of the fan unit 22 mounted to the blade supporter 1221 with the electric wiring 25 extending in the receiving cavity 1225 of the cup shape frame body 1220 of the power supporting frame 122. Preferably, the electric wiring between the power supply 21 and the control unit 23 is extended from the power supporter 1222 to the panel supporter 1223 via the blade supporter 1221. Such that the electrical components and electric wiring of the air circulator of the present invention are arranged along a central path and concealed within the power supporting frame 122 according to the preferred embodiment so as to isolate from the air flowing in the guiding chamber 120 of the airflow channel 100 to provide an electrical compact arrangement and achieve better and easier operation and performance for the air circulator. Such concealing arrangement to the electrical components and electric wiring in the guiding chamber 120 is especially important when the air is humidified to contain desired moisture during the purifying of the air in the purifying chamber 110.

The control panel 24 is mounted on the panel supporter 1223 of the power supporting frame 122 and positioned above the control unit 23, which substantially covers and secured all electrical components, including the control unit 23, the motor 222 and the electric wiring 25, disposed within an enclosed environment, i.e. the receiving cavity 1225. The control unit 23 is electrically connected to the control panel 24 upwardly and the blade unit 221 and motor 222 of the fan unit 22 downwardly through the receiving cavity 1225.

It is worth mentioning that the outer guiding surface 1224 of the cup shape frame body 1220 of the power supporting frame 122 is gradually and smoothly extended upwardly and outwardly from the bottom end to the top end of the cup shaped frame body 1220, wherein the outer guiding surface 1224 and the inclined airflow guiding surface 12121 of the guiding wall 1212 define the guiding chamber 120 therebetween. The curvature of the outer guiding surface 1224 and the airflow guiding surface 12121 provides a guiding effect to the air flowing upwardly through the guiding chamber 120 which substantially drives the air flowing upwards and outwards when discharging through the air outlet 1210.

According to the preferred embodiment, the circulation of air is illustrated in FIG. 5. After the power assembly 20 of the air circulator is activate by operation on the control panel 24, a controlling command is sent to the control unit 23 to actuate the motor 222 energized by the power supply 21 such that the blade unit 221 is driven by the motor 222 rotated in the airflow channel 100 to drive air near the surrounding shell 111 of the inlet case 11 to collect and enter into the filtering chamber 110 radially. After filtered with the air filter 30, the air is drive to turn upwards and discharge out of the guiding shell 121 of the outlet case 12 along the airflow channel 100 in a spiral manner.

In particular, the air is driven to enter the purifying chamber 110 through the air inlet 1110 of the surrounding shell 111. After being filtered radially through the air filter 30, the air is forced to flow towards the central connector 112. In other words, the air around the surrounding shell 111 is capable of flowing in contact with the air filter 30 in every angle and then is gathered to the central portion of the surrounding shell 111, i.e. the airflow turning portion 1001 of the purifying chamber 110.

Accordingly, referring to FIG. 5, when the fan unit 22 is actuated to drive the fan unit 221 to rotate, the suction force will drive air outside and around the airflow inlet 1110 of the inlet case 11 to flow into the purifying chamber 110. Then, the inletting air will be forced to flow through the air filter 30 for filtration and gain humidify if there is water or additive provided in the base groove 1130 of the bottom base 113 of the inlet case 11 and reach the airflow turning portion 1001 of purifying chamber 110, which is a central space of the purifying chamber 110 and surrounding by the air filter 30. Since the fan unit 22 is installed right above the airflow turning portion 1001, the air flowing into the airflow turning portion 1001 will be driven by the fan unit 22 upwardly to flow into the guiding chamber 120. Due to the arrangement of the airflow guiding ribs 12114 and the guiding inlet 12113 of the guiding frame 1211, the purified air being driven by the fan unit 22 to flow from the purifying chamber 110 through guiding inlet 12113 will be guided to flow helically in form a spiral airflow into the lower half of the guiding chamber 120, i.e. the interior space within the support frame 1212. The fan unit 22 in the lower half of the guiding chamber 120 will push the spiral airflow flowing upwardly to the upper half of the guiding chamber 120, where the outer guiding surface 1224 and the inclined airflow guiding surface 12121 will guide the air flowing upwardly and outwardly to discharge through the air outlet 1210. When the air flowing through the air outlet 1210 upwardly and outwardly, the airflow outlet ribs 12132 of the outlet frame 1213 will further guide and drive the air to discharge helically, upwardly and outwardly, as shown in FIG. 2 and FIG. 5, that enables the purified air to flow out to reach a higher height and wider distance to cover more space so as to greatly enhance the air circulation of air in the room containing the air circulator of the present invention.

In view of above, the purifying chamber 110 and the guiding chamber 120 are coaxially aligned from bottom to top inside the airflow guiding housing 10 to define the airflow channel 100 therein. Since dust and particles in the air usually sink to the lower portion of the air in a specific area due to gravity, the air inlet 1110 is designed to be provided of the around the peripheral side of the surrounding shell 111 of the inlet case 11 connected under the outlet case 12 while the air outlet 1210 is provided at the top side of the outlet case 12 that is the topmost position of the airflow guiding housing 10, allowing the airflow channel 100, so as to obtain a longest airflow channel 100, the longest air flowing path and the best air circulation effect for the airflow guiding housing 10. Also, the arrangement of the electrical components of the power assembly 20, including the power supply 21, fan unit 22, the control unit 23, and electric wiring 25, is positioned the central portion of the guiding chamber 120 of the outlet case 12 by containing within the cup shape frame body 1220, such that the electrical components can be concealed and protected by the cup shape frame body 1220 while allowing the user to operate the air circulator simply and easily at the control panel 24 mounted on the top side thereof and feel the outletting air emitted from the air outlet 1210 around the control panel 24, and that the air flowing up through the guiding chamber 120 can also be guided upwardly and outwardly around the outer guiding surface 1224 of cup shape frame body 1220. Such arrangement not only can ensure the air circulator of the present invention to have a relatively compact size and balanced lighter weight while all components are symmetrically arranged, but also provide an effective airflow channel 100 for guiding the air to flow in at a lower position radially via the air inlet 1110, to turn 90 degrees to flow up at the airflow turning portion 1001 of the purifying chamber 110 to enhance purifying of the inletting air, to drive the air to flow from the purifying chamber 110 into the guiding chamber 120 upwardly and spirally by the airflow guiding ribs 12114 to enhance the delivery of the air upwardly, to guide the air to flow out upwardly and outwardly by means of the cup shape frame body 1220 that contains and protects the electrical components from moisture in the air, and to flow out the air circulator upwardly, outwardly and helically by means of the airflow outlet ribs 12132 for better air circulation ability and larger coverage space of the air circulator of the present invention.

The outer guiding surface 1224 and the inclined airflow guiding surface 12121 can be smooth surfaces. In other alternative embodiments, the guiding surface 1224 and/or inclined airflow guiding surface 12121 may have grooves or protrusions, extended upwardly and spirally, provided for desired air guiding purposes. Person skilled in the art may take advantage of designing various shapes and curvatures of the outer guiding surface 1224 and the inclined airflow guiding surface 12121 to perform different predetermined guiding and air flowing effects.

Figure 6:
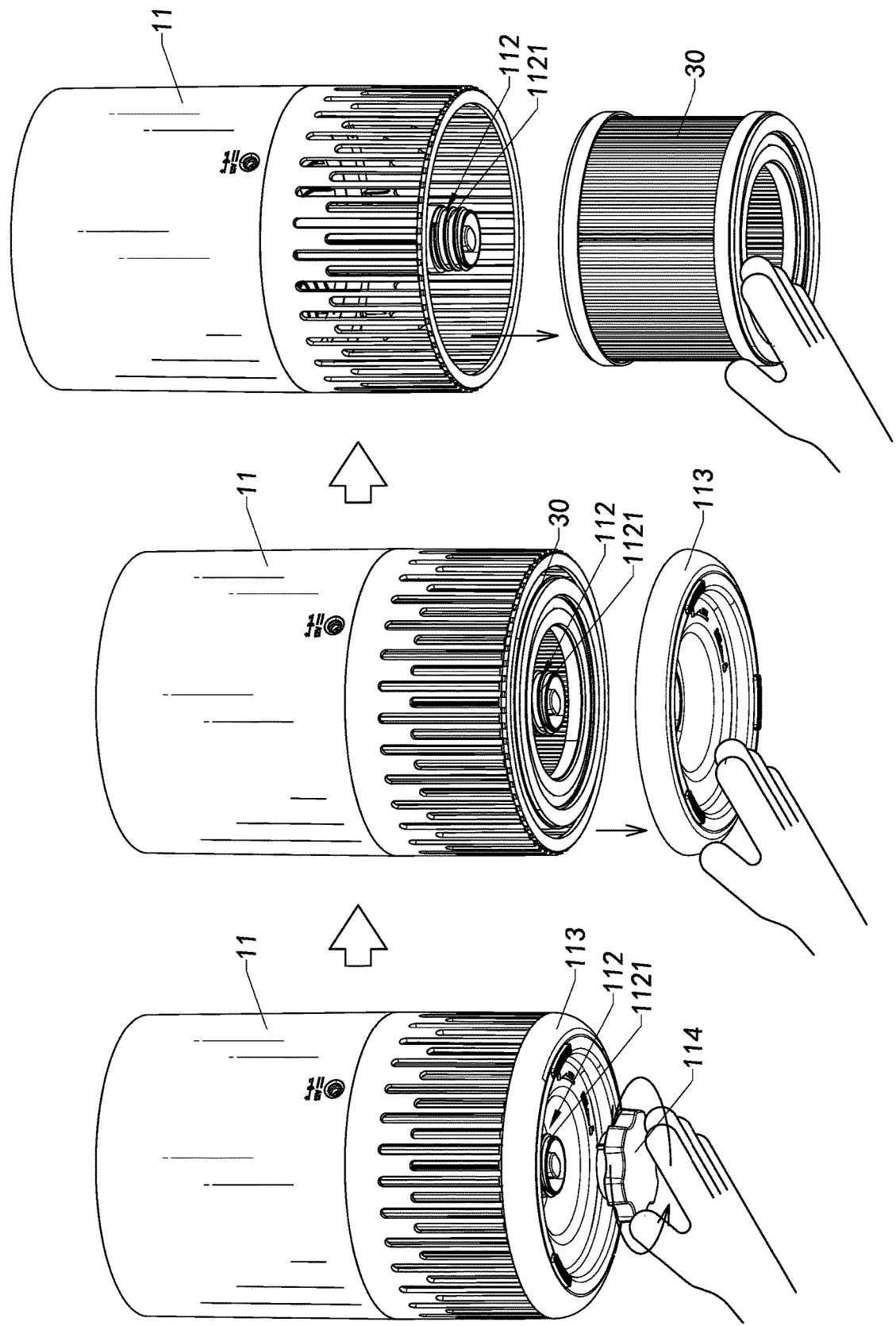
FIG. 6 illustrates assembling views of the air circulator according to the above preferred embodiment of the present invention, illustrating the detaching of the air filter.

According to the preferred embodiment, referring to FIG. 6, the operation of replacement of the air filter 30 is illustrated. The fastener 114 is first unscrewed and detached from the first end 1121 of the central connector 11. The bottom base 113 is further detached from the surrounding shell 111. The air filter 30 disposed on the bottom base 113 can be removed from the surrounding shell 111. In other words, the air filter 30 is capable of taking out downwardly away from the surrounding shell 111. After replacing a new air filter 30 in surrounding shell 111 of the inlet case 11, the bottom base 113 is putting back to cover the bottom end of the surrounding shell 111 until the first end 1121 of the central connector 112 is extended out the bottom base 113. By screwing back the fastener 114 with the first end 1121, the bottom base 113 is relatively secured to the surrounding shell 111, wherein the fastener 114 limits the bottom base 113 from detaching the surrounding shell 111. It is worth to mention that, when the airflow guiding housing 10 is placed in upward position, during detaching the air filter 30 from the inlet case 11, the air filter 30 is relatively dropping down from the bottom that can reduce pollution to the surrounding environment. Also, it is easy to clean the contaminated air filter 30 to avoid secondary pollution.

Figure 7:
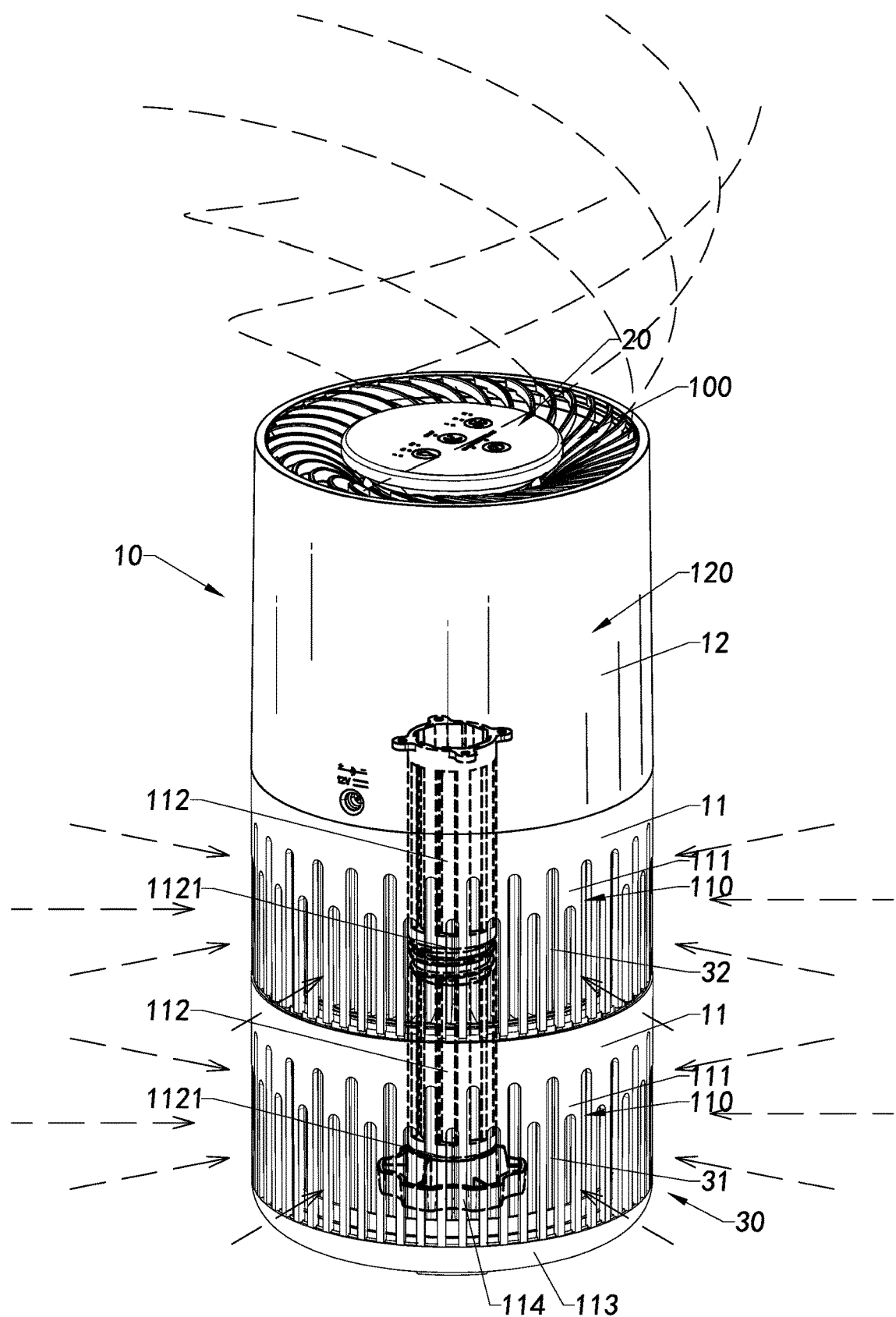
FIG. 7 is a perspective view illustrating an alternative mode of the air circulator according to the above preferred embodiment of the present invention.

In an alternative mode of preferred embodiment of the present invention, two or more inlet cases 11 superposed with each other can be used as shown in FIG. 7. The two inlet cases 11 are coaxially superposed on each other by connecting the central connectors 112 together coaxially. Specifically, two of the central connectors 112 are connected in end to end manner. In this alternative mode, two surrounding shells 111 are aligned and connected in edge to edge manner, wherein only one fastener 114 is required to fasten one bottom base 113 to the bottom end of the last surrounding shell 11 so that two inlet cases 11 are secured with the outlet case 12.

Since the two surrounding shells 11 have two purifying chambers 110 and respectively accommodate two air filters 31, 32, the purifying effect and air circulating ability of the air circulator of the present invention can be doubled.

Figure 8:
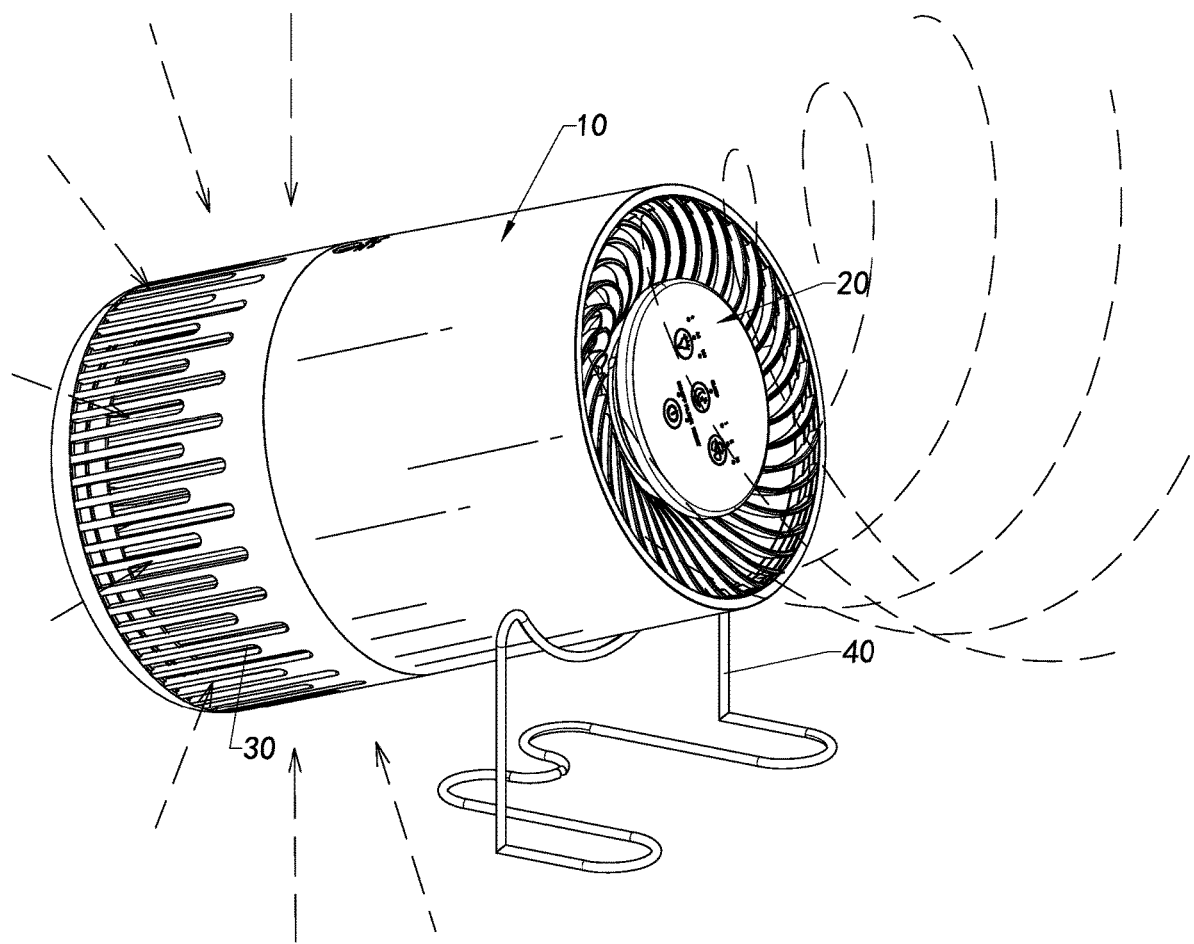
FIG. 8 is a perspective view illustrating an application mode of the air circulator according to the above preferred embodiment of the present invention.

Referring to FIG. 8, the air circulator according to the preferred embodiment may further comprises a holder 40 which is adapted to support on the outlet case 12 of the airflow guiding housing 10 in an inclined angle on a support surface. In other words, the holder 40 can assist the airflow guiding housing 10 to discharge the purified air toward a certain angular direction to facilitate the air circulation for a user positioned near the air outlet 1210. Also, the airflow guiding housing 10 may also be placed or hanged at various positions, such as a wall surface, when the holder 40 is mounted on wall.

Figure 9:
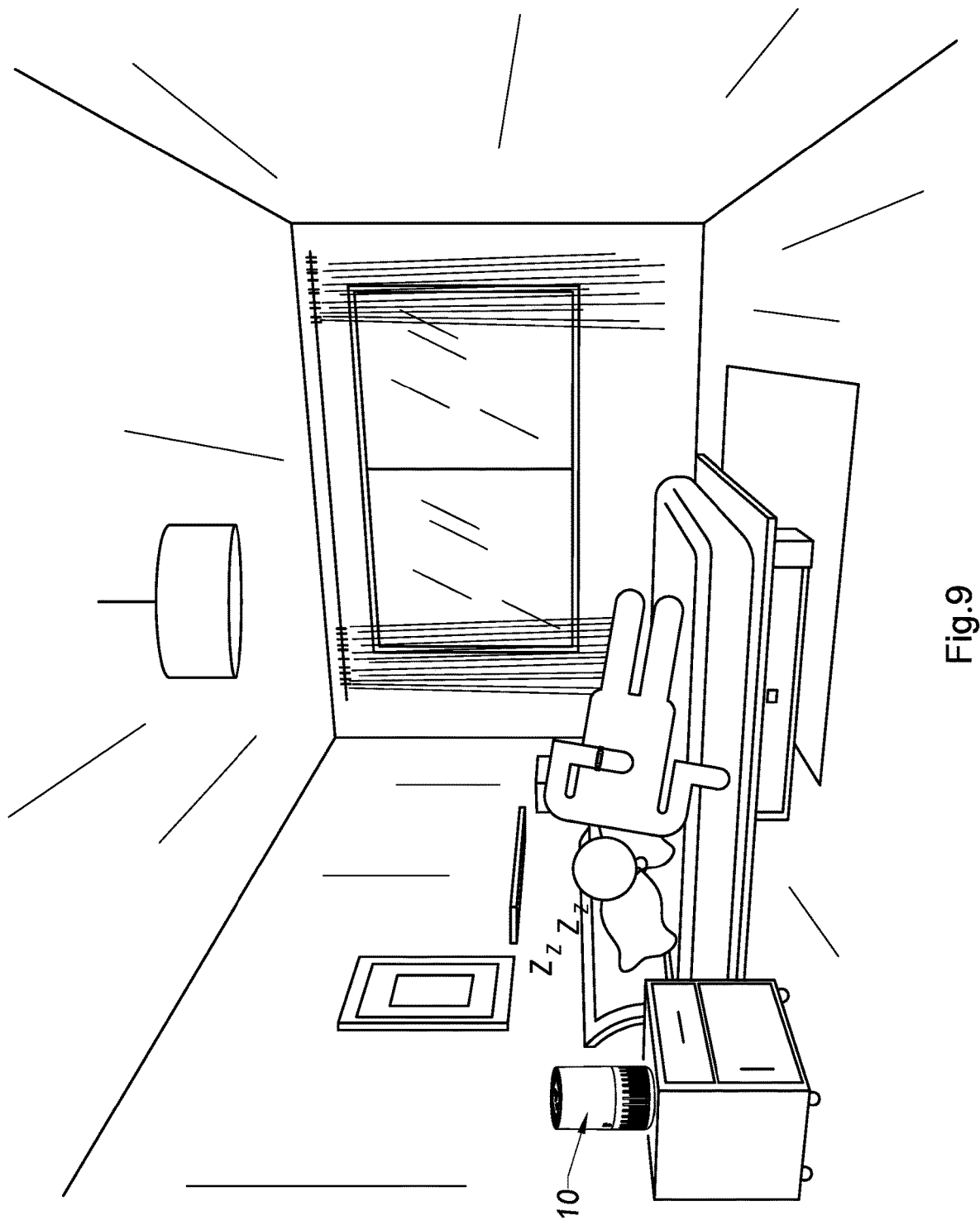
FIG. 9 is a perspective view illustrating another application mode of the air circulator according to the above preferred embodiment of the present invention.

Referring to FIG. 9, it is apparent that the airflow guiding housing 10 is adapted to be placed with different placement, angle and height to meet different applications in the need for air circulation. The air filter 30 is also adapted for being replaced by different types of the filter 30 such as a purified filter, a fragrance filter, a humidification filter, and other types of filter to meet different needs of air circulation and purification. The air circulator is in lightweight and adapted to be portable to be transferred conveniently and further promote air circulation in different regions of a room or even in a vehicle.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. An air circulator, comprising:

an airflow guiding housing having an airflow channel extending between an air inlet formed at a lower peripheral side of said air flow guiding housing for air flowing radially into said airflow channel and an air outlet formed at a top side of said airflow guiding housing for air discharging out upwardly from said airflow channel, wherein said airflow channel has an airflow purifying chamber positioned at a lower portion thereof and adjacent to said air inlet and a guiding chamber positioned at an upper portion thereof and adjacent to said air outlet, wherein said airflow channel has an airflow turning portion in said purifying chamber where the air flowing in through said air inlet turns a predetermined angle into said guiding chamber, wherein said airflow guiding housing comprises a power supporting frame which comprises a cup shape frame body supported inside an upper portion of said guiding chamber of said airflow channel inside said airflow guiding housing, wherein said power supporting frame further comprises an outlet frame which comprises an outer outlet rim connected to said top end of said airflow guiding housing and a plurality of airflow outlet ribs spacedly and helically extended from said upper end of said cup shape frame body to said outer outlet rim, wherein gaps between said airflow outlet ribs form said air outlet of said airflow guiding housing; and a power assembly, installed in said airflow channel of said airflow guiding housing, providing a suction power to drive the air flowing into said airflow channel through said air inlet and deliver the air flowing out said airflow channel through said air outlet, wherein said air flowing through said airflow channel is guided to turn the predetermined angle at said airflow turning portion in said purifying chamber, wherein an upper end of said cup shape frame body is mounted to a top end of said airflow guiding housing to form said top side of said airflow guiding housing and said air outlet is provided around said upper end of said cup shape frame body, wherein a lower end of said cup shape frame body, which has a size smaller than that of said upper end, is extended to a lower portion of said guiding chamber of said airflow channel to support said power assembly for providing the suction force in said lower portion of said guiding chamber so as to drive air flowing from said purifying chamber into said guiding chamber and discharge out through said air outlet on top of said airflow channel, wherein said cup shape frame body has a receiving cavity defined therein for receiving electric components and wiring of said power assembly and a cup shape outer guiding surface extending upwardly and outwardly for guiding the air flowing through said guiding chamber to flow upwardly and outwardly, wherein power assembly comprises a fan unit electrically powered by a power supply and a control unit with a control panel provided thereon for operation at least an actuation of said fan unit, wherein said fan unit is supported at said lower end of said cup shape frame body to disposed in said lower half of said guiding chamber for drawing the air from said purifying chamber into said guiding chamber for discharging through said air outlet, wherein said control panel is mounted on said upper end of said cup shape frame body and said control unit is electrically connected with said fan unit through said receiving cavity which is covered and concealed by said control panel.

2. The air circulator, as recited in claim 1, wherein said upper end of said cup shape frame body is lower than said outer outlet rim and said airflow outlet ribs are extended upwardly, spacedly and helically from said upper end of said cup shape frame body to said outer outlet rim.

3. The air circulator, as recited in claim 2, wherein a plurality of inlet slots are spacedly and vertically formed in said lower peripheral side of said airflow guiding housing to communicate with said purifying chamber and form said air inlet around said lower peripheral side of said airflow guiding housing for allowing outside air entering said purifying chamber therethrough.

4. The air circulator, as recited in claim 3, further comprising an air filter disposed in a bottom portion of said airflow guiding housing and positioned in said purifying chamber of said airflow channel adjacent to said air inlet adapted for filtering air before flowing into said guiding chamber, wherein an interior space surrounded by said air filter within said purifying chamber forms said airflow turning portion of said purifying chamber positioning right below said fan unit of said power assembly in said guiding chamber for driving the air filtered by said air filter to turn up and flow upwardly into said guiding chamber, wherein a size of said airflow turning portion is smaller than a size of said lower half of said guiding chamber.

5. The air circulator, as recited in claim 4, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

6. The air circulator, as recited in claim 3, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

7. The air circulator, as recited in claim 2, further comprising an air filter disposed in a bottom portion of said airflow guiding housing and positioned in said purifying chamber of said airflow channel adjacent to said air inlet adapted for filtering air before flowing into said guiding chamber, wherein an interior space surrounded by said air filter within said purifying chamber forms said airflow turning portion of said purifying chamber positioning right below said fan unit of said power assembly in said guiding chamber for driving the air filtered by said air filter to turn up and flow upwardly into said guiding chamber, wherein a size of said airflow turning portion is smaller than a size of said lower half of said guiding chamber.

8. The air circulator, as recited in claim 2, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

9. The air circulator, as recited in claim 1, wherein a plurality of inlet slots are spacedly and vertically formed in said lower peripheral side of said airflow guiding housing to communicate with said purifying chamber and form said air inlet around said lower peripheral side of said airflow guiding housing for allowing outside air entering said purifying chamber therethrough.

10. The air circulator, as recited in claim 9, further comprising an air filter disposed in a bottom portion of said airflow guiding housing and positioned in said purifying chamber of said airflow channel adjacent to said air inlet adapted for filtering air before flowing into said guiding chamber, wherein an interior space surrounded by said air filter within said purifying chamber forms said airflow turning portion of said purifying chamber positioning right below said fan unit of said power assembly in said guiding chamber for driving the air filtered by said air filter to turn up and flow upwardly into said guiding chamber, wherein a size of said airflow turning portion is smaller than a size of said lower half of said guiding chamber.

11. The air circulator, as recited in claim 10, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

12. The air circulator, as recited in claim 9, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

13. The air circulator, as recited in claim 1, further comprising an air filter disposed in a bottom portion of said airflow guiding housing and positioned in said purifying chamber of said airflow channel adjacent to said air inlet adapted for filtering air before flowing into said guiding chamber, wherein an interior space surrounded by said air filter within said purifying chamber forms said airflow turning portion of said purifying chamber positioning right below said fan unit of said power assembly in said guiding chamber for driving the air filtered by said air filter to turn up and flow upwardly into said guiding chamber, wherein a size of said airflow turning portion is smaller than a size of said lower half of said guiding chamber.

14. The air circulator, as recited in claim 1, wherein said airflow guiding housing comprises an inlet case and an outlet case, wherein said inlet case comprises a hollow surrounding shell and a bottom base detachably mounted to a bottom end of said surrounding shell to define said purifying chamber in said surrounding shell, wherein said inlet slots are formed around a bottom portion of said surrounding shell, wherein said bottom base has a base groove adapted for disposing at least a purifying additive therein, wherein said outlet case comprises said power supporting frame and a guiding frame which comprise a hollow outer case shell, adapted for receiving said power supporting frame therein and defining said guiding chamber therein, having a top end to connected with said outlet frame and a bottom end connecting with a top end of said surrounding shell of said inlet case to form said airflow guiding housing, wherein said guiding frame further comprises a support frame which is supported at said bottom end of said case shell and has a central hub and a plurality of guiding ribs extended around said central hub spacedly and helically to define a guiding inlet to guide the air flowing from said purifying chamber into said guiding chamber in a spiral manner, wherein said inlet case further comprises a central connector having one end connected to said central hub and another end connected to said bottom base so as to connect said bottom base with said case shell to form said inlet case and connect said inlet case with said outlet case to form said airflow guiding housing at the same time.

* * * * *